United States Patent [19]

Doi

[11] Patent Number: 5,029,319
[45] Date of Patent: Jul. 2, 1991

[54] CLEANING SHEET FOR A MAGNETIC DISC

[75] Inventor: Hajime Doi, Toride, Japan

[73] Assignee: Hitachi Maxell, Ltd., Osaka, Japan

[21] Appl. No.: 382,996

[22] Filed: Jul. 21, 1989

[30] Foreign Application Priority Data

Jul. 25, 1988 [JP] Japan .................................. 63-183591

[51] Int. Cl.$^5$ ...................... G11B 23/03; B65D 85/30
[52] U.S. Cl. .................................. 360/133; 206/444; 428/900
[58] Field of Search .................. 360/128, 133, 137; 206/444

[56] References Cited

U.S. PATENT DOCUMENTS 4,419,164 12/1983 Martinelli ............................. 360/133
4,709,816 12/1987 Matsumoto et al. ................. 360/133
4,803,584 2/1989 Doi et al. ............................. 360/133
4,812,938 3/1989 Rogers et al. ....................... 360/133

Primary Examiner—John H. Wolff
Assistant Examiner—Jefferson Evans
Attorney, Agent, or Firm—Birch, Stewart, Kolasch & Birch

[57] ABSTRACT

Disclosed is a disc cartridge comprising a cartridge case, a disc set rotatably in the cartridge case, and cleaning sheets secured to the inside of the cartridge case, wherein at least the disc side surface layer of each cleaning sheet, which is brought into direct sliding contact with the disc in operation, is almost entirely composed of ultrafine fibers having a diameter of less than 10 $\mu$m producing an excellent disc cleaning effect on the disc, lessening the errors in the recording and reproducing operations of the disc.

13 Claims, 5 Drawing Sheets

CLEANING SHEET FOR A MAGNETIC DISC

BACKGROUND OF THE INVENTION

1. Technical Field

This invention relates to a disc cartridge having a magnetic disc or optical disc set rotatably in a cartridge case molded from a hard synthetic resin or in a flexible cartridge case. More particularly the invention relates to a cleaning sheet applied in the cartridge so that the sheet will be in sliding contact with the disc in the cartridge in operation for cleaning the disc surface.

2. Description of Prior Art

A magnetic disc cartridge comprises principally a cartridge case having a magnetic head inlet and an opening for passing through a drive shaft, a flexible magnetic disc set rotatably in the cartridge case, and cleaning sheets secured to the inside of the cartridge case.

A cleaning sheet used in magnetic disc cartridges has been made of a non-woven fabric of synthetic fiber, such as polyethylene terephthalate fiber or acrylic fiber, and secured to the inside of the cartridge case by means of, for instance, ultrasonic sealing or an adhesive.

The fibers constituting the conventional cleaning sheets were relatively large in size, such as about 15 to 30 $\mu$m in diameter, and unable to perfectly sweep away and hold therein fine particles of dust and dirt adhering on the magnetic disc, especially those having a slight tackiness, and this has been a cause of error in the recording and reproducing operations of the magnetic disc.

The present invention has for its object to eliminate such defects of the prior art and to provide a disc cartridge which is guaranteed to perfectly clean the disc surface by use of specifically designed cleaning sheets to eliminate errors.

SUMMARY OF THE INVENTION

For attaining the object of the present invention there is provided a disc cartridge comprising essentially a cartridge case which, for instance, is molded from a hard synthetic resin or made of a flexible sheeting material, a disc such as a flexible magnetic disc set rotatably in the cartridge case, and a pair of cleaning sheets secured to the inside of the cartridge case.

The present invention features a specific structure for a cleaning sheet in which at least the disc side surface layer of the sheet, which is brought into direct sliding contact with the disc during operation, is substantially entirely composed of ultrafine fibers having a diameter less than 10 $\mu$m.

BRIEF DESCRIPTION OF THE DRAWINGS

The drawings illustrate a magnetic disc cartridge implementing an embodiment of the present invention, in which.

DESCRIPTION OF THE PREFERRED EMBODIMENTS

The present invention will hereinafter be described more particularly with reference to the preferred embodiments of the invention and the accompanying illustrations.

The thermoplastic synthetic resins usable for making the cartridge case according to the present invention include, for example, ABS resin, polyacetal resin, polystyrene resin and the like, and such resin is injection molded into a desired form of the cartridge case.

The magnetic disc set in the cartridge case comprises, for example, a polyester or polyimide film coated on its one side on both sides with a magnetic layer and has a moderate degree of flexibility.

Referring to FIGS. 1 to 6, there are shown schematic drawings illustrating a typical example of a magnetic disc cartridge in accordance with the instant invention.

Figure 1:
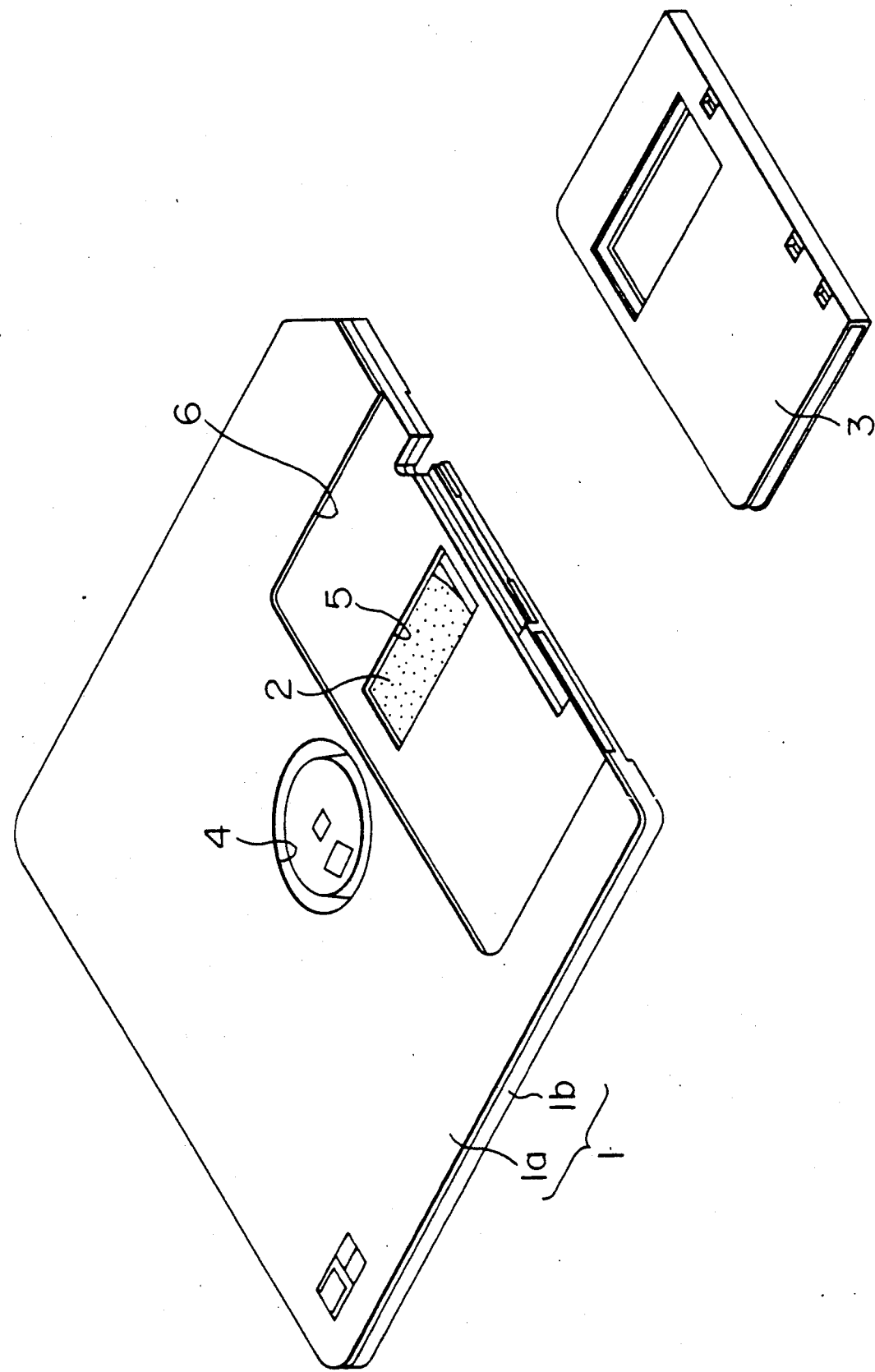
FIG. 1 is an exploded perspective view of the magnetic disc cartridge.
Figure 2:
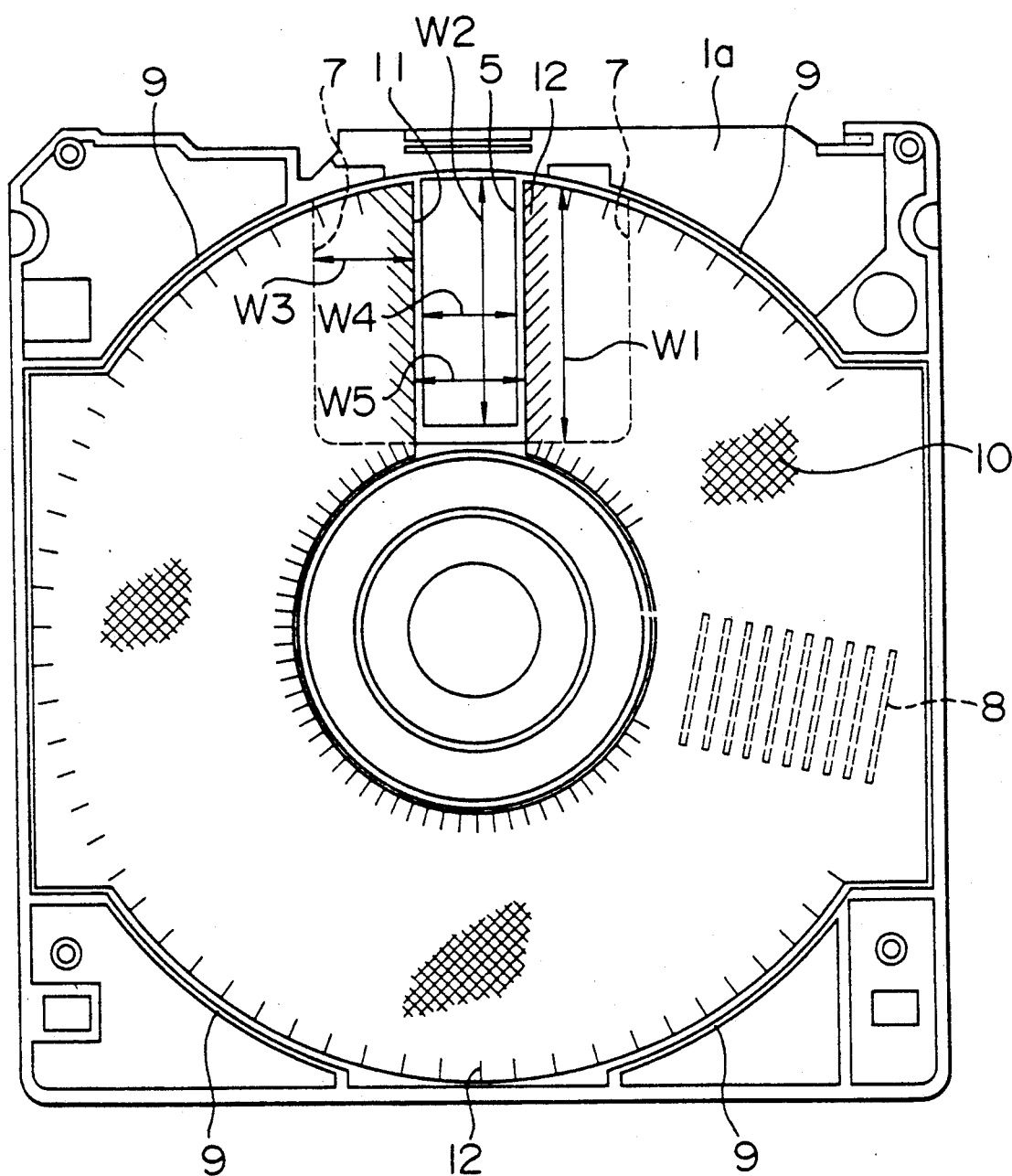
FIG. 2 is a bottom view of the cartridge, showing a state in which a cleaning sheet is secured in position on the inside of an upper case member.
Figure 3:
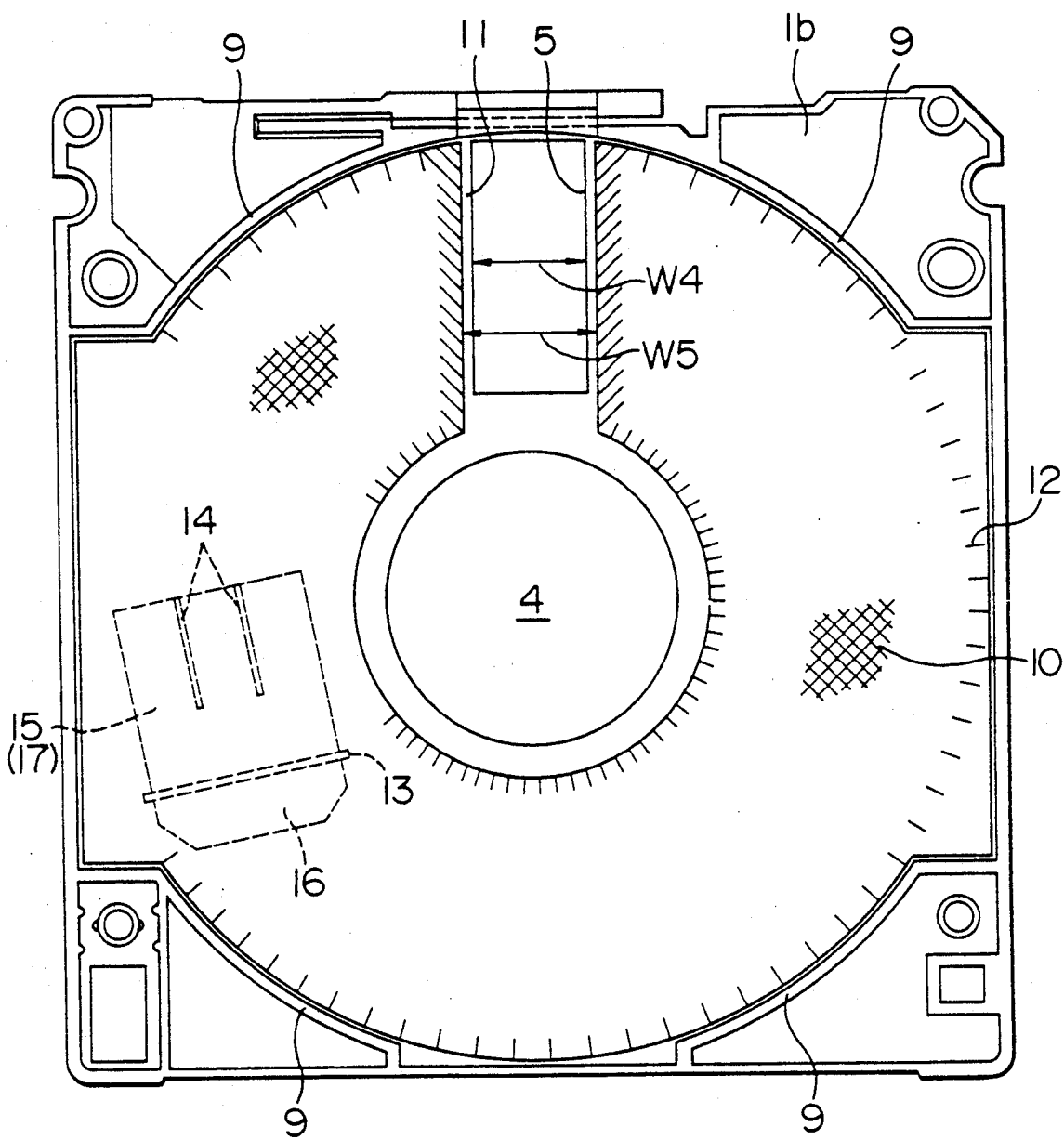
FIG. 3 is a plan view of the cartridge, showing a state in which a cleaning sheet is secured in position on the inside of a lower case member.
Figure 4:
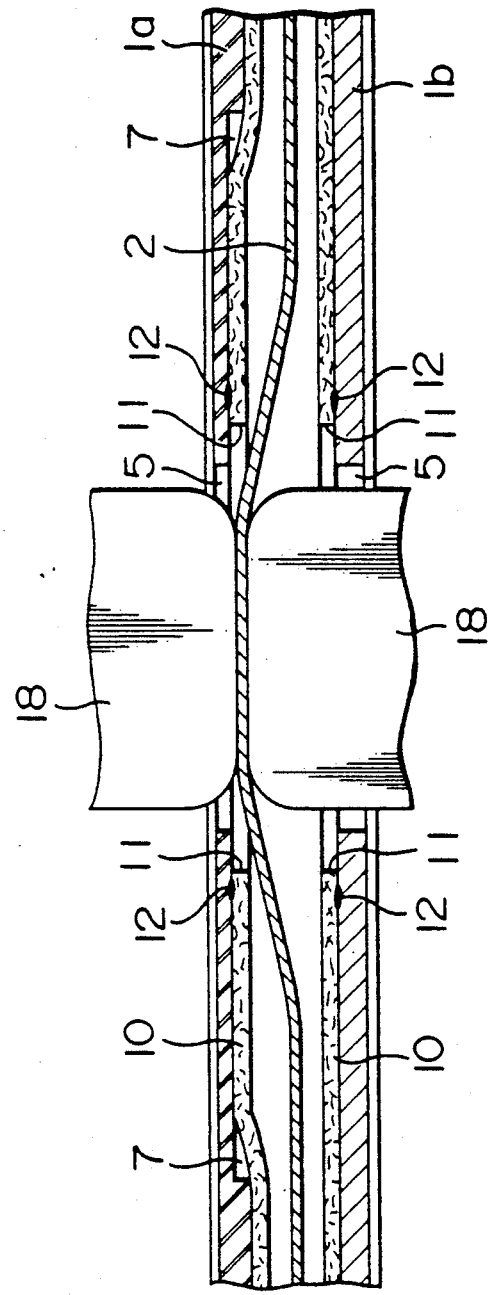
FIG. 4 is an enlarged sectional view of the magnetic head insertion opening and its surroundings, illustrating a mode of use of the magnetic disc cartridge.
Figure 6:
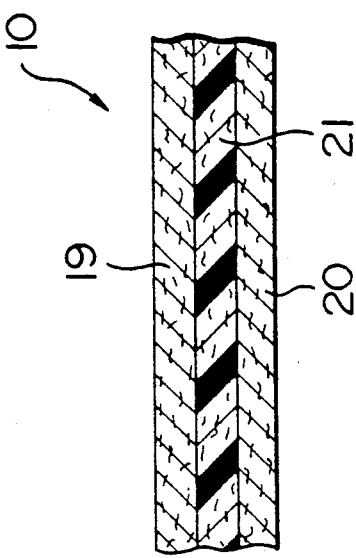
FIG. 6 is an enlarged sectional view of a cleaning sheet.
Figure 5:
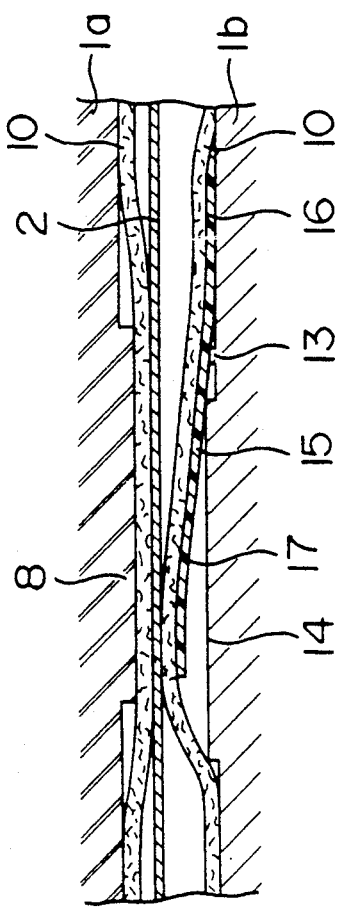
FIG. 5 is an enlarged sectional view of an elastic member and its surroundings in the magnetic disc cartridge.

In these drawings, FIG. 1 is an exploded perspective view of the disc cartridge, and FIG. 2 is a bottom view thereof, showing a state in which a cleaning sheet is secured in position in an upper case member. FIG. 3 is a plan of the cartridge, showing a state in which another cleaning sheet is set in position in a lower case member. FIG. 4 is an enlarged sectional view of the magnetic disc inserting opening and its immediate vicinity, showing a mode of use of the magnetic disc cartridge. FIG. 5 is an enlarged sectional view of an elastic member and its neighboring parts in the magnetic disc cartridge, and FIG. 6 is an enlarged sectional view of a cleaning sheet.

The magnetic disc cartridge according to the present invention consists essentially of a cartridge case 1, a magnetic disc 2 set rotatably therein, and a shutter 3 supported slidably on the cartridge case 1.

The cartridge case 1 consists of an upper case member 1a and a lower case member 1b. Both case members can be injection molded from a hard synthetic resin, such as ABS resin.

Substantially centrally positioned in the lower case member 1b is an opening 4 for passing through a drive shaft, and near the opening 4 is also provided a rectangular opening 5 for inserting a magnetic head. A similar magnetic head insertion opening 5 is also formed in the upper case member 1a. On the front side of each of the upper and lower cases 1a and 1b is provided a recess 6 which is slightly recessed from the case surface so as to define the range of sliding movement of the shutter 3, and the magnetic head insertion opening 5 is formed at the central position of the recess 6, as shown in FIG. 1.

On the inside of the upper case member 1a and on both sides of the magnetic head insertion opening 5 are formed spot facing recesses 7, 7, as shown in FIG. 2. The longitudinal width W1 of the recesses 7 is almost equal to the longitudinal width W2 of the magnetic head inserting opening 5, and the transverse width W3 of the recesses 7 is defined to be not less than 0.3 times, preferably 0.5 to 1.5 times, the transverse width W4 (width in the direction orthogonal to the longitudinal direction) of the magnetic head insertion opening 5.

On the inside of the upper case member 1a and upstream of the magnetic head insertion opening 5 in the direction of disc rotation are provided a plurality of linearly extending protrusions 8a. The two protrusions 8 positioned on both outer sides of the array of protrusion 8a are slightly higher than the remaining ones.

On the inside of the upper case member 1a are also provided the arcuate ribs 9 designed to regulate positioning of the magnetic disc 2. A part of the rib passes an end of the corresponding one of the recesses 7 so that the ribs 9 can serve as a reinforcement for the surroundings of the recesses 7.

On the inside of the ribs 9 is fitted a substantially C-shaped cleaning sheet 10. In the cleaning sheet 10 is formed an opening 11 in alignment with the magnetic head insertion opening 5. The transverse width W5 of the opening 11 is slightly larger than the transverse width W4 of the magnetic head inserting opening 5. The cleaning sheet 10 is placed on the inner surface of upper case member 1a so that the recesses 7 and protrusions 8a are covered, too. The periphery of the cleaning sheet 10 is fixed to the upper case member 1a by ultrasonic sealing. Ample spacing of each recess 7 in the upper case member 1a makes it possible to perform ultrasonic sealing of the edge of the opening 11 in the cleaning sheet 10, as shown in FIG. 4.

On the inside of the lower case member 1b and at a position substantially opposing the protrusions 8a of upper case member 1a, there are provided a raised support strip 13 and adherence-preventive ridges 14, as shown in FIGS. 3 and 5. There is also provided an elastic member 15 formed by bending a plastic sheet and, as shown in FIGS. 3 and 5, the proximal portion 16 of the elastic member 15 is secured by any suitable means, such as bonding or heat fusion, to a part on the inside of the lower case member 1b and near the support strip 13. The free end 17 of the elastic member 15 is held in a slanted state by the support strip 13.

The regulating ribs 9 are also provided on the inner surface of the lower case member 1b, and cleaning sheet 10 is disposed inside of the ribs. In the cleaning sheet 10 is formed an opening 11 at a position in alignment with the magnetic head insertion opening 5. The transverse width W5 of the opening 11 is slightly larger than the transverse width W4 of the magnetic head insertion opening 5. As the cleaning sheet 10 is set on the inside of the lower case member 1b as shown in FIG. 3, the elastic member 15 is covered and, although the periphery of the cleaning sheet 10 is secured to the lower case member 1b by ultrasonic sealing 12, such ultrasonic sealing need not be applied in the neighborhood of the elastic member 15.

When a magnetic disc cartridge is assembled by combining upper and lower case members 1a and 1b, the cleaning sheet in the lower case member 1b is partly raised up by the elastic member 15, as shown in FIG. 5, and the raised-up sheet is slightly held back by the protrusions 8a provided on the inside of the upper case member 1a, so that the magnetic disc 2 is elastically held between the upper and lower cleaning sheets 10, 10. Thus, as the magnetic disc 2 rotates it is cleaned on both sides thereof by the cleaning sheets 10.

FIG. 4 illustrates a mode of use of the magnetic cartridge case in accordance with this invention. In the drawing, numeral 18 denotes magnetic head.

The cleaning sheet 10 is 150 to 300 μm in thickness and has a three-layer structure as shown in FIG. 6. It consists of a non-woven fabric layer 19 on the side opposing magnetic disc 20, a non-woven fabric layer 20 on the side opposing cartridge case 1, and an intermediate non-woven fabric layer 21 joining said disc side and case side non-woven fabric layers 19 and 20.

The disc side and case side non-woven fabric layers 19 and 20 are both composed of ultrafine single fibers with a diameter of 0.5 to 3 μm. In each of these layers, the fibers are so arranged that the front side and rear side of the layer are undistinguishable from each other. The intermediate non-woven fabric layer 21 is composed of fibers having a diameter of 15 to 30 μm. The fibers in the disc side non-woven fabric layer 19 and intermediate non-woven fabric layer 21 are entangled with each other as are the fibers in the case side non-woven fabric layer 20 and intermediate layer 21, thus forming an integral layer of entwined fibers as a whole.

When a magnetic disc cartridge is assembled by using the three-layer structured cleaning sheets 10 and used practically, it may happen that the fibers brought into sliding contact with the rotating magnetic disc 2 are not all the ultrafine fibers in the disc side non-woven fabric layer 21, and a few of the fibers having relatively large sizes in the intermediate non-woven fabric layer 21 may come out onto the surface side of the cleaning sheet 10 due to entanglement of the fibers and contact with the magnetic disc 2. Even in such a case, however, the ratio at which the fibers in the intermediate non-woven fabric layer 21 are caused to contact the magnetic disc 2 is less than 10%, so that it may be said that substantially all of the fibers which contact the magnetic disc 2 in a practical operation are almost entirely ultrafine fibers in the disc side non-woven fabric layer 19.

The composition of the magnetic layer applied in this invention will be described below.

In the present invention, fine powders of metals such as iron, cobalt, cobalt-nickel, cobalt-phosphorus, cobalt-containing ferric oxide and the like are usable as ferromagnetic metal powder. Iron powder is used in the Examples of the invention described below. The properties of iron powder used in the Examples are as shown in Table 1.

TABLE 1

| | |
|---|---|
| HC (Oe) | 1,650 |
| σs (emu/g) | 130 |
| BET surface area (m²/g) | 44.8 |
| Average particle diameter (μm) | 0.25 |

A lubricant in the magnetic layer, there can be used, for example, oleyl oleate, 2-heptylundecyl oleate, perfluoroalkyl ether, perfluoroalkyl polyether, fluorine oil, silicone oil, liquid paraffin and the like. In the Examples of this invention described below, oleyl oleate is used as the lubricant.

Urethane resin, epoxy resin and the like are usable as a curable resin in the magnetic layer. Urethane resin is used in the described Examples of this invention.

A preferred composition of the magnetic layer used in this invention is shown in Table 2.

TABLE 2

| Composition | Wt parts | Wt % |
|---|---|---|
| Magnetic powder of metallic iron | 100 | 63.9 |
| Vinyl chloride resin | 12 | 7.7 |
| Urethane resin | 7 | 4.5 |
| Crosslinking agent | 5 | 3.1 |
| Aluminum oxide (particle diam.: 0.4–50 μm) | 20 | 12.8 |
| Carbon black | 2 | 1.3 |
| Oleyl oleate | 9 | 5.8 |
| Butylcellulose stearate | 1 | 0.6 |
| Zinc stearate | 0.5 | 0.3 |

The fiber diameter, cleaning performance and durability of the cleaning sheet according to this invention will now be described.

Samples of the cleaning sheet were prepared by using the fibers differing in size (diameter), and magnetic disc cartridges were assembled by using these samples of the cleaning sheet. On one side of the magnetic disc set in each of the cartridges was deposited 1 g of dust Type 11, Type 12 and Type 14 prescribed according to JIS, and each of the thus prepared magnetic disc cartridges was set in a magnetic disc recording and reproducing device. After the magnetic disc in each cartridge was allowed to rotate continuously for 10 seconds, the dust-adhering condition on the disc surface was visually examined and evaluated. The results are shown in Table 4.

The JIS-prescribed types of dust used in this invention are shown in Table 3.

TABLE 3

| | | (unit: μm) | |
|---|---|---|---|
| Type | Dust used | Particle size distribution | Mean diameter |
| 11 | Kanto loam | 0.5–8 | 2 |
| 12 | Carbon black | 0.03–0.2 | — |
| 14 | Aerosol | 0.3–3 | 0.8 |

TABLE 4

| | Fiber diameter (μm) | | | | |
|---|---|---|---|---|---|
| Test dust | 0.1 | 0.5 | 3 | 10 | 15 |
| Type 11 | 5 | 5 | 5 | 4 | 4 |
| Type 12 | 5 | 5 | 4 | 3 | 2 |
| Type 14 | 5 | 5 | 4 | 4 | 3 |

The disc surface evaluation in Table 4 is based on a 5-point system, in which "5" is the best, and "4" is the next best. Poorer evaluations are means by the smaller figures.

The relation between the size of fibers of cleaning sheet and its durability is discussed below.

Cleaning sheets were prepared by using fibers with different sizes and magnetic disc cartridges were assembled by using these cleaning sheets. The magnetic layer on each magnetic disc was of the composition shown in Table 2. For evaluating the durability of the cleaning sheet, each of the magnetic disc cartridges was set in a recording and reproducing device, then the magnetic disc was rotated at a speed of 300 r.p.m. while depressing the vicinity of the magnetic head inserting opening by a load of 10 g, and the number of rotations of the magnetic disc that lasted until the fibers at the surface portion of the cleaning sheet were perfectly worn out. The results are shown in Table 5.

TABLE 5

| (unit: times of rotation) | | | | |
|---|---|---|---|---|
| Fiber diameter (μm) | | | | |
| 0.1 | 0.5 | 3 | 10 | 15 |
| Less than 10,000 | 100,000 | 1,000,000 | 10,000,000 | 10,000,000 |

As seen from Tables 4 and 5 when the diameter of the fibers in at least the disc side surface layer of a cleaning sheet is less than 10 μm, the cleaning sheet is capable of reliably sweeping away and holding therein fine dust and dirt particles, even slightly adhesive ones (the latter will be further discussed later), thus exhibiting an excellent cleaning capability. It is to be noted, however, that too small a fiber diameter gives rise to the problem of durability of the cleaning sheet, so that the fiber diameter should practically be not less than 0.5 μm. Considering both cleaning performance and durability of the cleaning sheet, it is desirable that the diameter of fibers in the disc side surface layer of the cleaning sheet be in the range of from 0.5 to 3 μm.

A method of producing the above-mentioned ultrafine fibers having a diameter less than 10 μm will be briefly described below.

These fibers can be composed of polyester, polyamide, acrylic resin, rayon and the like. For instance, when using the materials having no affinity for each other, such as polyester and polyamide, these materials are disposed alternately along the peripheral direction in a nozzle and passed through the nozzle to form composite fibers in which, when seen across a fiber section, the polyester layers and polyamide layers are arranged alternately fanwise along the peripheral direction. Then these composite fibers are subjected to a chemical treatment, by which the polyamide layers are shrunk and separated from the polyester layers so that they break up individually, thus forming the ultrafine fibers. In these fibers, the weight ratio of polyester to polyamide is preferably in the range of 50:50 to 75:25.

Although an example using different types of material having no affinity for each other was shown above, it is possible to form ultrafine fibers by using a same material. In this case, there are made fibers of a structure in which, when seen across a fiber section, a thin layer of a release agent or a soluble substance is formed between each fan-shaped layer and its adjoining fan-shaped layer, and then these fibers are subjected to a proper treatment to split and break up the respective fan-shaped layers.

FIGS. 7 to 10 show the modifications of the cleaning sheet 10 in accordance with the present invention.

Figure 7:
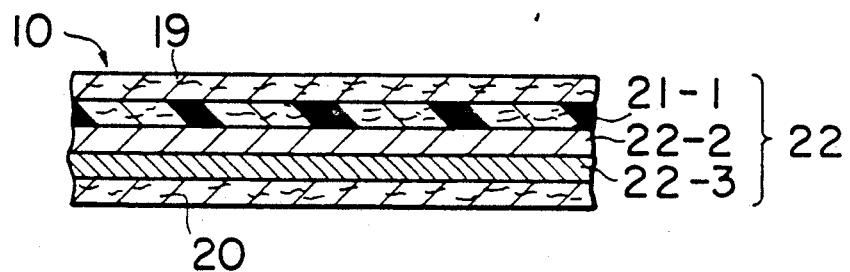
FIGS. 7, 8 and 9 are enlarged sectional views showing the modifications of the cleaning sheet in accordance with the present invention.

In the modification shown in FIG. 7, both of the disc side non-woven fabric layer 19 and case side non-woven fabric layer 20 are composed of ultrafine fibers having a diameter of 0.5 to 3 μm. The intermediate non-woven fabric layer 21 consists of a first intermediate layer 21-1 composed of fibers of 3 to 6 μm in diameter, a second intermediate layer 21-2 composed of fibers of 6 to 10 μm in diameter and a third intermediate layer 21-3 composed of fibers of 10 to 20 μm in diameter. As shown in the drawing, the first to third intermediate layers 21-1, 21-2 and 21-3 are arranged in that order downwardly from the disc side non-woven fabric layer 19 toward the case side non-woven fabric layer 20.

Figure 8:
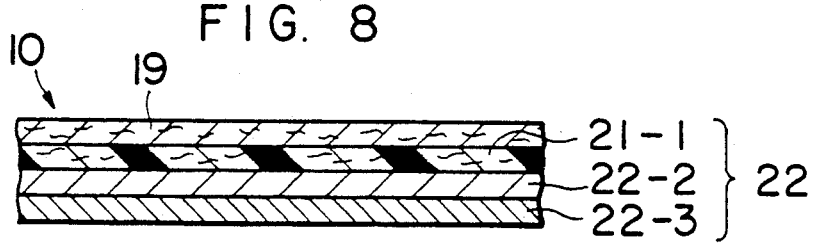

In the example of FIG. 8, unlike in the sheet of FIG. 7, there is provided no case side non-woven fabric layer 20 and the third intermediate layer 22-3 is fusion bonded or otherwise secured to the inside of the cartridge case.

Figure 9:
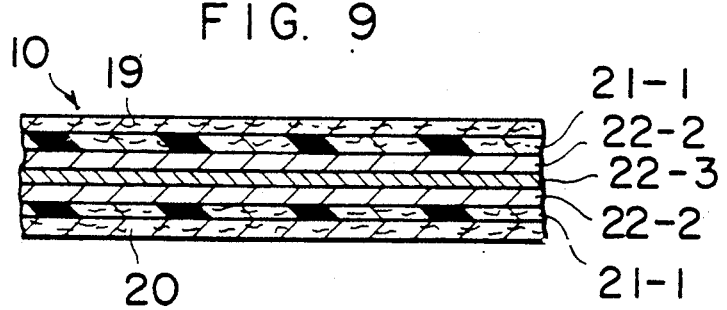

In the embodiment shown in FIG. 9, both of the first and second intermediate layers 21-1 and 21-2 are provided in pairs symmetrically with the third intermediate layer 21-3 as the center thereof. Thus, both sides of this sheet are undistinguishable from each other.

Holding of fine dust and dirt in the cleaning sheet is even more ensured when using a plural of layers of fibers with different sizes, namely ultrafine fibers and fibers of greater diameters, as shown in FIGS. 3 to 9.

Figure 10:
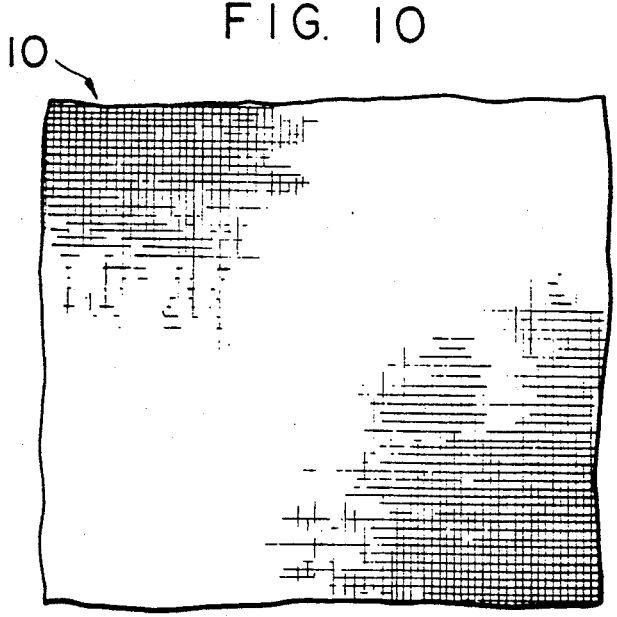
FIG. 10 is a plan view showing still another modification of a cleaning sheet according to the present invention.

FIG. 10 shows still another modification of a cleaning sheet according to this invention. In this case, a woven fabric or knit made with ultrafine fibers is used in a single or plural layers as the cleaning sheet. In the case of using the fabric or knit in plural layers, it is necessary that at least the disc side surface layer be composed of ultrafine fibers with a diameter of less than 10 $\mu$m, but other layer(s) may not necessarily be composed of ultrafine fibers.

Also, a sheet may be made with a non-woven fabric, woven fabric or knit containing ultrafine fibers, and such sheet may be washed to use as a cleaning sheet.

In the case of using particulate magnetic powder as mentioned before, fine dust and dirt particles tend to be produced from sliding contact with the magnetic head or other causes, so that in such a case the effect of the cleaning sheet according to this invention becomes more conspicuous.

Also, in the case where a lubricant is contained in the magnetic layer as mentioned before, or when a curable resin is contained in the magnetic layer and a part of such resin remains uncured, there tends to be produced dust and dirt particles having slight adhesiveness. The cleaning sheet of this the present invention shows an excellent cleaning and holding effect even for such type of dust and dirt particles as noticed from the results shown in FIG. 4.

While the present invention has been described with reference to its embodiments applied to a magnetic disc cartridge, this invention is not limited to such use but can be applied as well to other types of disc cartridge, such as an optical disc cartridge, optomagnetic disc cartridge, etc.

Being structured as described above, the disc cartridge provided according to the present invention is capable of reliably sweeping away and holding therein fine particles of dust and dirt, so that the dust and dirt causes no errors in the disc operations and therefore enhances reliability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A disc cartridge comprising a cartridge case having an upper case member and lower case member, a disc set rotatably in said cartridge case, and a cleaning sheet secured to an inside of each of said cartridge case members, wherein at least a disc side surface layer of each of said cleaning sheets, which is brought into direct sliding contact with said disc in operation, is substantially entirely composed of ultrafine fibers having a diameter of less than 10 $\mu$m.

2. A disc cartridge according to claim 1, wherein said disc is a magnetic disc having a magnetic layer containing particulate magnetic metal powder.

3. A disc cartridge according to claim 1 or 2, wherein said magnetic layer contains a lubricant.

4. A disc cartridge according to claim 1, wherein each respective cleaning sheet consists of a non-woven fabric of said ultrafine fibers.

5. A disc cartridge according to claim 1, wherein each respective cleaning sheet is made of a woven fabric or knit of said ultrafine fibers.

6. A disc cartridge according to claim 1, wherein each of said respective cleaning sheets is composed of a plurality of layers of fibers having different sizes, at least said disc side surface layer of each of said cleaning sheets, which is brought into direct sliding contact with said disc in operation, being substantially entirely composed of ultrafine fibers having a diameter less than 10 $\mu$m.

7. A disc cartridge according to claim 6, wherein said ultrafine fibers have a diameter of from 0.5 to 3 $\mu$m.

8. A disc cartridge according to claim 1, wherein said magnetic layer contains a curable resin.

9. A disc cartridge according to claim 1, wherein said ultrafine fibers have a diameter of from 0.5 to 3 $\mu$m.

10. A cleaning sheet for a magnetic disc of a disc cartridge, comprising a multiplicity of non-woven fabric layers composed of ultrafine single fibers having a diameter of less than 10 $\mu$m.

11. A cleaning sheet according to claim 10, wherein said ultrafine single fibers have a diameter of from 0.5 to 3 $\mu$m.

12. A cleaning sheet for a magnetic disc of a disc cartridge, comprising a multiplicity of woven fabric or knit layers composed of ultrafine single fibers having a diameter of less than 10 $\mu$m.

13. A cleaning sheet according to claim 12, wherein said ultrafine single fibers have a diameter of from 0.5 to 3 $\mu$m.

* * * * *